March 17, 1925.  
J. T. MELTON  
GATE VALVE  
Filed May 10, 1923  
1,530,006  
3 Sheets-Sheet 1

Inventor  
JAMES T. MELTON

March 17, 1925.
J. T. MELTON
GATE VALVE
Filed May 10, 1923
1,530,006
3 Sheets-Sheet 2
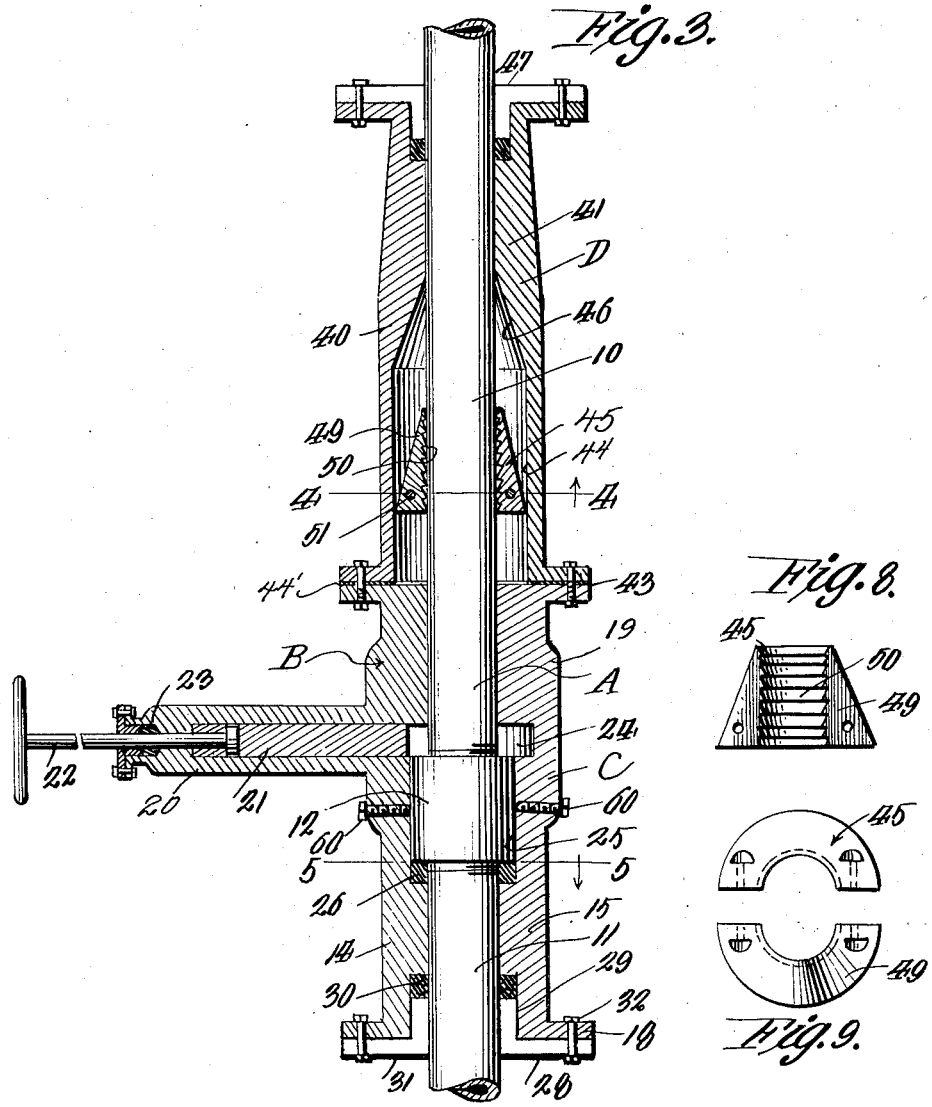
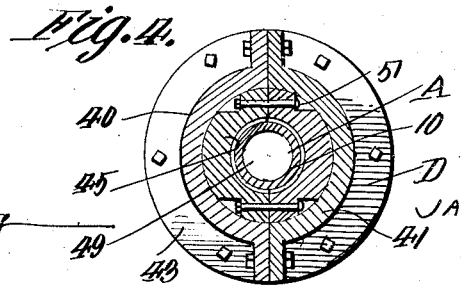
Inventor
JAMES T. MELTON March 17, 1925.  1,530,006

J. T. MELTON

GATE VALVE

Filed May 10, 1923  3 Sheets-Sheet 3

WITNESSES

Inventor
JAMES T. MELTON
By Richard B. Owen
Attorney

Patented Mar. 17, 1925.

1,530,006

UNITED STATES PATENT OFFICE.

JAMES T. MELTON, OF HAYNESVILLE, LOUISIANA.

GATE VALVE.

Application filed May 10, 1923. Serial No. 638,042.

*To all whom it may concern:*

Be it known that I, JAMES T. MELTON, a citizen of the United States, residing at Haynesville, in the parish of Claiborne and State of Louisiana, have invented certain new and useful Improvements in a Gate Valve, of which the following is a specification.

This invention comprehends vital improvements in valves and the primary object of the invention is to provide an improved gate valve which can be associated with pipe lines or with well pipe casings without necessitating the cutting or the detaching of the sections of the pipe line or well casing until after the valve is placed in position, thereby preventing the loss of any material which may be flowing through the said pipe line or well casing.

In oil wells considerable loss is often sustained by the well catching on fire and as no means is provided for cutting the flow of oil, the fire burns continuously until the well exhausts itself. It is therefore another prime object of the invention to provide a gate valve which can be connected with the exterior of a well casing and the point of connection of two lengths thereof and maintained in fluid tight connection therewith, the gate valve being so constructed as to permit the separation of the lengths of the well casing and thereby permitting the operation of the gate valve to shut off the flow of oil therethrough and thus effectively preventing waste of oil and enabling the stopping of fire at the mouth of the well.

Another prime object of the invention is to provide a novel gate valve constructed in a pair of companion longitudinal sections for permitting the same to be clamped to the exterior of a pipe line or well casing and novel means for connecting the sections together in fluid tight engagement with one another and with the pipe line or well tubing or casing.

A further object of the invention is to provide novel means for connecting the casing for the gate valve with one pipe length of a pipe line or valve casing and novel means connected with the gate valve casing for engaging the other pipe length.

A still further object of the invention is to provide an improved gate valve of the above character, which will be durable and efficient in use, one that will be simple and easy to manufacture and one which can be placed upon the market at a reasonable cost.

With these and other objects in view, the invention consists in the novel construction, arrangement and formation of parts as will be hereinafter more specifically described, claimed and illustrated in the accompanying drawings, in which drawings:

Figure 1 is a side elevation of the improved split gate valve showing the same applied to a well casing or tubing.

Figure 2 is a section through the same taken on the line 2—2 of Figure 1 looking in the direction of the arrows.

Figure 3 is a longitudinal section through the improved split gate valve taken on the line 3—3 of Figure 2.

Figure 4 is a horizontal section taken on the line 4—4 of Figure 3.

Figure 5 is a horizontal section taken on the line 5—5 of Figure 3.

Figure 8 is a detail view of one section of the slip employed for holding one of the pipe lengths of a well casing or tubing against longitudinal movement.

Figure 9 is a bottom plan view of the same.

Figure 6:
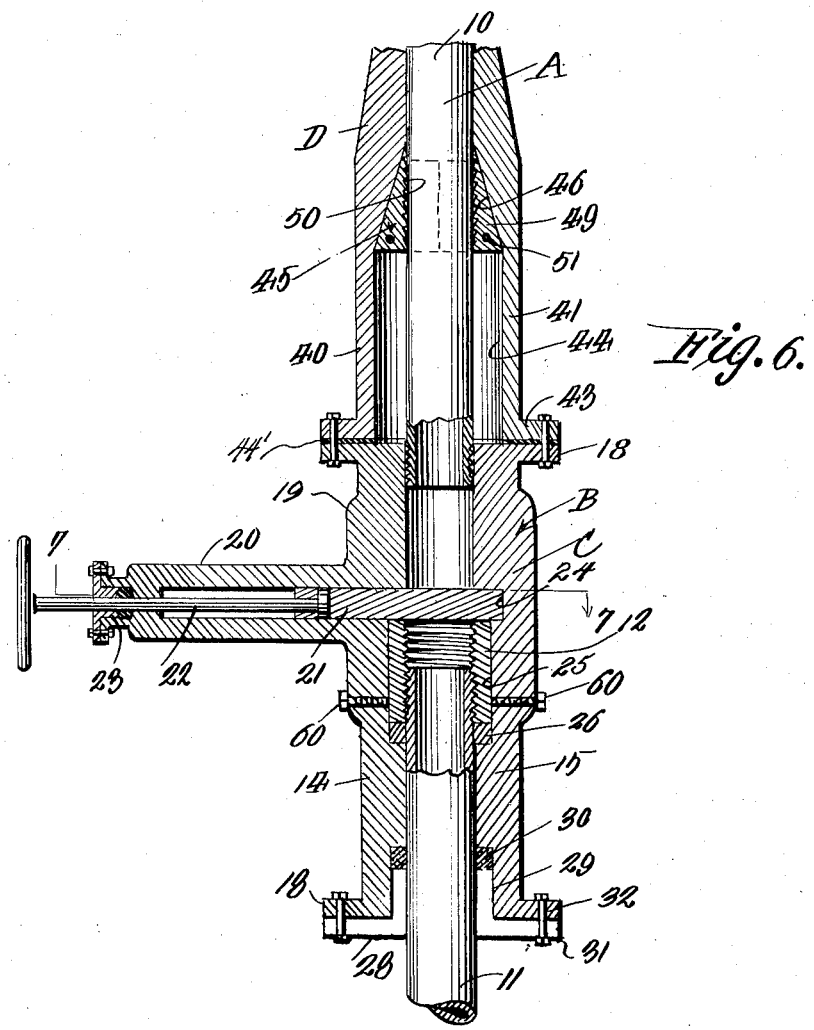
Figure 6 is a longitudinal section through the improved split gate valve similar to Figure 3 showing parts of the well casing or tubing in section and the upper length of the tubing or casing in a raised clamped position and the gate valve proper in a closed position to cut off the flow of oil therethrough.
Figure 7:
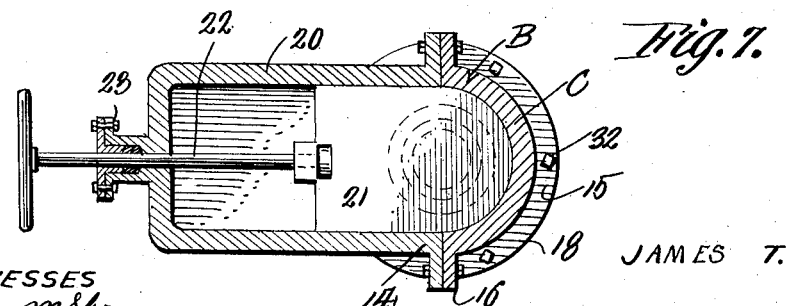
Figure 7 is a horizontal section through the valve taken on the line 7—7 of Figure 6.

Referring to the drawings in detail, wherein similar reference characters designate corresponding parts throughout the several views, the numerals 10 and 11 indicate sections of a well casing or tubing A, which are adapted to be connected together by suitable collar or the like 12 which can be of the usual or any preferred type, and B indicates the novel split gate valve which is adapted to be applied thereto.

The improved split gate valve B comprises the main or gate valve section C and the clamping or holding section D.

The main or gate valve section C comprises a pair of companion longitudinal sections 14 and 15 provided with abutting flanges 16, which are adapted to be connected together by suitable bolts or the like 17. If so desired, gaskets or the like can be placed between the flanges 16. Each end of each section 14 and 15 terminates in a semi-annular attaching flange 18 and these flanges 18 form a continuous annular shoulder when the sections 14 and 15 are clamped together.

The sections 14 and 15 at a point intermediate their ends are enlarged exteriorly as at 19 and one section carries a laterally extending gate valve housing 20, in which is reciprocably mounted any preferred type of gate valve 21, which is controlled by a valve rod 22. This valve rod 22 is extended through any preferred type of packing gland 23. The companion sections 14 and 15 are provided with means for forming a seat 24 for the valve, so that when the same is slid inwardly to its innermost position as shown in Figure 6, the flow of fluid through the valve proper or main section C will be eliminated. Directly below the valve seat 24 the sections are reamed out interiorly to provide a chamber 25 for the reception of the coupling 12 and if so desired this coupling 12 can be formed integral with the lower pipe section 11 of the well tubing A. A suitable lead ring or the like 26 formed in sections is adapted to be placed upon the shoulder defined by the cut out or reamed out portion 25 so as to form a seat for the said coupling 12.

In order to form a fluid tight connection between the lower end of the main section B of the improved device, a sectional packing gland 28 is provided, which consists of a sleeve portion 29, which is adapted to extend into the sections 14 and 15 and fit against a suitable gasket or packing 30, and a flange portion 31 which is adapted to be bolted or otherwise connected as at 32 to the flanges 18 formed upon the lower or outer ends of the sections 14 and 15.

It is obvious that the sleeve portion 29 will compress the packing into intimate engagement with the pipe length 11. The flange portions 31 of the sectional packing gland 28 are adapted to be so disposed that their meeting faces will be arranged at right angles to the meeting faces of the sections 14 and 15 of the main section C of the device, so as to form means for firmly uniting the said sections 14 and 15 together.

The pipe length gripping means or section D also comprises a pair of longitudinal sections or companion members 40 and 41 provided at their meeting faces with packing flanges 42 and at their terminals with semi-annular flanges 43. These flanges 43 form means for permitting the bolting of the sections to either end of the gate valve or main section C. When the same is bolted to the gate valve or section C a suitable packing gasket or the like 44' can be placed between the flanges. The interior of the sections 40 and 41 are preferably hollowed out to provide an enlarged way or chamber 44 for the sectional pipe gripping means or slip 45, which will hereinafter more fully appear, and the inner end of this chamber 44 terminates in a conical clamping portion 46 for forcing the sections of the slip or pipe clamping means 45 into intimate biting contact with the said pipe. The outer end of the section B has associated therewith a sectional gland 47 which is similar to the gland 28 so as to prevent the leakage of the material past the section D and the pipe length with which it is associated.

The pipe gripping means or slip 45 embodies a pair of semi-conical sections 49, which are provided at their interior faces with a plurality of semi-annular cutting or biting teeth 50 for engaging a pipe section or length. These parts can be loosely connected together by means of bolts or the like 51.

In use of the improved split gate valve, when it is desired to cut off the flow of oil through a well tubing or casing for any reason, such as when the well catches on fire or the like, a tunnel is dug down to the well casing at a point below the mouth thereof and where sections of the well casing are connected together. The sections or parts 14 and 15 of the gate valve section C are then clamped about one pipe length as clearly shown in Figure 3 of the drawings, while the sections 40 and 41 of the clamping section D are clamped about the other pipe lengths. The sections or parts C and D are connected together by means of bolts 43. In case the pipe length 11 is not provided with a coupling or collar 12, a clamping section D can be secured to the lower end thereof as well as to the upper end thereof for holding and engaging the pipe. After the sections or parts C and D are placed in opposite position around the pipe lengths 10 and 11 the uppermost pipe length is turned so as to unthread the same from engagement with the coupling or the upper end of the pipe section 11 after which this pipe length 10 is raised, which will bring the sections of the slip 45 into binding contact with the conical portion 46 of the chamber which will bring the teeth 50 into biting contact with the pipe and thus prevent the pipe from being further lifted, it being understood that the slip will wedge itself in the conical portion 46 of the chamber 44.

The gate valve 21 can now be slid to its closed position which will effectively cut off the flow of oil without the loss of a single drop thereof.

If the lengths 10 and 11 of the pipe are connected together by means of the coupling 12, the same can be held against rotation by suitable set screws or the like 60.

From the foregoing description it can be seen that an improved means has been provided for permitting the convenient connection of a gate valve with a pipe line or well casing for effectively cutting off the flow of oil therethrough without the loss of a single cup of oil or other fluid which may be passed through the pipe line or oil casing.

Changes in details may be made without departing from the spirit or the scope of this invention.

What I claim as new is:—

1. The combination with a pipe including a pair of lengths of a gate valve including a pair of sections, means for clamping the sections about the pipe at the point of connection of the lengths thereof, means for establishing fluid tight communication between the sections and the lengths of pipe, and means for permitting the separation of the lengths of pipe whereby the gate valve can be used to shut off the flow of fluid through said pipe including a sliding pipe slip carried by one of said sections.

2. The combination with a pipe including a pair of lengths detachably connected together, of a gate valve embodying a clamping section and a gate valve section, the pipe clamping section and the valve section each including a pair of longitudinal companion portions, means for connecting the portions together, means connecting the pipe clamping and valve section together, means for establishing fluid tight connection between the lengths and the pipe clamping section of the valve section, and means for permitting the separation of the length to permit the operation of the valve sections to cause the control of the flow of fluid through the pipes including pipe gripping means carried by the lower section and a sliding and rotatable pipe gripping means carried by the upper section.

3. The combination with a pair of sections of a well casing and a coupling for connecting the sections together, of a split gate valve for the casing comprising a valve body for engaging the upper end of one section, a pipe clamping body for engaging the lower end of the adjacent section, each of said bodies including a pair of longitudinal companion sections, means for clamping the companion sections together, means for detachably connecting the bodies together, a seat formed in the valve body for receiving the coupling for connecting the casing sections together, a gate valve carried by the valve body arranged directly above the seat formed therein for engaging the coupling, and pipe slips slidably mounted in the pipe clamping body for engaging the second mentioned section of the casing, when the same is moved to a raised position out of engagement with the coupling.

In testimony whereof I affix my signature in presence of two witnesses.

JAMES T. MELTON.

Witnesses:
 FRED L. YOUNG,
 E. T. TETE.